US010844964B2

(12) United States Patent
Abouelleil et al.

(10) Patent No.: US 10,844,964 B2
(45) Date of Patent: *Nov. 24, 2020

(54) VALVE WITH ACTIVE SEAL AND SHAFT BLOWOUT PREVENTION DEVICE

(71) Applicant: Mueller International, LLC, Atlanta, GA (US)

(72) Inventors: Ashraf Abouelleil, Oswego, IL (US); Vadim Lorman, Skokie, IL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/456,608

(22) Filed: Jun. 28, 2019

(65) Prior Publication Data

US 2019/0316684 A1 Oct. 17, 2019

Related U.S. Application Data

(62) Division of application No. 15/808,936, filed on Nov. 10, 2017, now Pat. No. 10,378,656.

(51) Int. Cl.
*F16K 1/226* (2006.01)
*F16K 41/02* (2006.01)

(52) U.S. Cl.
CPC .......... *F16K 1/226* (2013.01); *F16K 1/2265* (2013.01); *F16K 1/2268* (2013.01); *F16K 41/026* (2013.01)

(58) Field of Classification Search
CPC ...... F16K 1/226; F16K 1/2265; F16K 1/2268; F16K 41/026

USPC .................................. 251/304–317.01, 214
See application file for complete search history.

(56) References Cited

U.S. PATENT DOCUMENTS

| 2,940,725 | A | ‡ | 6/1960 | Nagel | ................... F16K 5/0673 |
| | | | | | 251/317 |
| 3,521,856 | A | * | 7/1970 | Smith | ..................... F16K 5/163 |
| | | | | | 251/172 |
| 3,556,476 | A | ‡ | 1/1971 | Haenky | ..................... F16K 1/24 |
| | | | | | 251/171 |

(Continued)

OTHER PUBLICATIONS

AS&P Article entitled: "V Packing Made of PTFE", located at <http://www.americansealandpacking.com/ptfev.htm>, publicly available prior to Nov. 10, 2017, 2 pgs.‡

(Continued)

*Primary Examiner* — John Bastianelli
(74) *Attorney, Agent, or Firm* — Taylor Engilsh Duma LLP

(57) ABSTRACT

A top cap for a valve includes an upper surface; and a lower surface distal from the upper surface; wherein the upper surface and the lower surface of the top cap define a bore and a bore axis, the bore extending from the upper surface to the lower surface, the top cap defining: a minor bore of the bore, the minor bore intersecting the upper surface and defining a minor bore diameter; and a major bore of the bore, the major bore intersecting the lower surface and defining a major bore diameter, the major bore diameter greater than the minor bore diameter, the top cap including a bore shoulder, the bore shoulder defining a bore shoulder surface extending from the minor bore to the major bore, the bore shoulder surface angled with respect to the bore axis of the top cap.

20 Claims, 6 Drawing Sheets

(56) References Cited

U.S. PATENT DOCUMENTS

| | | | | |
|---|---|---|---|---|
| 4,230,139 A ‡ | 10/1980 | Scaramucci | ......... | F16K 1/2263 137/74 |
| 4,410,003 A * | 10/1983 | Sandling | ............... | F16K 5/0271 137/312 |
| 4,428,561 A ‡ | 1/1984 | Thompson | ............ | F16K 5/0678 251/171 |
| 4,659,064 A ‡ | 4/1987 | Scobie | .................. | F16K 1/2268 251/214 |
| 4,886,241 A * | 12/1989 | Davis | ..................... | F16J 15/166 251/214 |
| 5,267,722 A ‡ | 12/1993 | Coulter | ................. | F16K 5/0673 251/315.01 |
| 5,326,074 A ‡ | 7/1994 | Spock, Jr. | ............ | F16K 41/046 251/214 |
| 6,622,987 B2 * | 9/2003 | Sterud | ..................... | F16K 41/02 251/214 |
| 7,017,915 B2 * | 3/2006 | Dorrian | .................. | F16J 15/186 251/214 |
| 8,496,227 B2 ‡ | 7/2013 | McCoy | ................. | F16K 5/0694 251/214 |
| 10,378,656 B2 | 8/2019 | Abouelleil | | |
| 2010/0102262 A1 ‡ | 4/2010 | Helfer | ................... | F16K 1/2268 251/214 |
| 2019/0145526 A1 | 5/2019 | Abouelleil et al. | | |

OTHER PUBLICATIONS

Forum Energy Technologies; Brochure for 709/719 Resilient Seated Butterfly Valves, publicly available prior to Nov. 10, 2017, 4 pgs.‡
Henry Pratt Company; Brochure for AWWA Butterfly Valves 3"-20", copyright 2016, 12 pgs.‡
Henry Pratt Company; Operating Manual for 3"-20" Bonded Seat Butterfly Valves, published Jan. 2017, 9 pgs.‡
Pratt Industrial; Brochure for "BF Series Wafer/Lug Butterfly Valves", copyright 2014, 12 pgs.‡
Abouelleil, Ashraf; Applicant-Initiated Interview Summary for U.S. Appl. No. 15/808,936, filed Nov. 10, 2017, dated Feb. 4, 2019, 3 pgs.
Abouelleil, Ashraf; Non-Final Office Action for U.S. Appl. No. 15/808,936, filed Nov. 10, 2017, dated Dec. 19, 2018, 22 pgs.
Abouelleil, Ashraf; Notice of Allowance for U.S. Appl. No. 15/808,936, filed Nov. 10, 2017, dated Apr. 3, 2019, 9 pgs.

* cited by examiner
‡ imported from a related application

VALVE WITH ACTIVE SEAL AND SHAFT BLOWOUT PREVENTION DEVICE

REFERENCE TO RELATED APPLICATIONS

This application is a divisional of U.S. application Ser. No. 15/808,936, filed Nov. 10, 2017, which is hereby specifically incorporated by reference herein in its entirety.

TECHNICAL FIELD

Field of Use

This disclosure relates to valves used in fluid systems. More specifically, this disclosure relates to valve seals that can also function as shaft blowout prevention devices.

Related Art

A valve, such as a butterfly valve in a fluid system, can comprise a valve shaft to actuate a mechanism for opening and closing the valve or otherwise adjusting a flow rate through the valve. The mechanism for actuating the valve can comprise, for example, a valve disc. Opening and closing the valve can comprise rotating the valve disc. To prevent leakage of the valve, various structures and methods have been used to seal the interface between moving parts of the valve such as, for example and without limitation, the valve shaft and stationary parts of the valve such as a trunnion of a valve body of the valve. Leakage from the valve can result in problems such as, for example and without limitation, costly repairs of the fluid system, contamination of surrounding air and soil, or even dangerous conditions for those nearby.

Such a valve can undergo shaft-disc separation by failing at a mechanical connection between the valve shaft and the valve disc. Such failure can cause "blowout" of the valve shaft. The valve shaft can cause damage and injury to persons and property around the valve due to the high rate of speed at which the valve shaft can exit the valve. Blowout can also result in a fire or an explosion if the fluid or the vapor in the fluid system is flammable or explosive. Such failure can be due to wear on the valve over time and can occur even when the valve is operated within its design limits of pressure and temperature.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a valve comprising: a valve body defining a shaft bore therethrough, the shaft bore defining an axis extending through the valve body; a valve shaft positioned within and configured to rotate within the shaft bore of the valve body, the valve shaft comprising a shaft shoulder defining a shaft shoulder surface facing upward; a top cap secured to the valve body, the top cap comprising a bore shoulder defining a bore shoulder surface facing downward, the bore shoulder surface facing the shaft shoulder surface; and a seal positioned between the top cap and the valve body, the seal configured to seal against leakage from between the valve body and the valve shaft.

In a further aspect, disclosed is a top cap for a valve, the top cap comprising: an upper surface; and a lower surface distal from the upper surface; wherein the upper surface and the lower surface of the top cap define a bore and a bore axis, the bore extending from the upper surface to the lower surface, the top cap defining: a minor bore of the bore, the minor bore intersecting the upper surface and defining a minor bore diameter; and a major bore of the bore, the major bore intersecting the lower surface and defining a major bore diameter, the major bore diameter greater than the minor bore diameter, the top cap comprising a bore shoulder, the bore shoulder defining a bore shoulder surface extending from the minor bore to the major bore, the bore shoulder surface angled with respect to the bore axis of the top cap.

In yet another aspect, disclosed is a method of assembling a valve, the method comprising: inserting a valve shaft into a shaft bore defined in a valve body of the valve, the valve shaft comprising a shaft shoulder defining a shaft shoulder surface facing upward; inserting a seal into a chamber defined in an upper surface of a top end of the valve body, the seal positioned about the valve shaft proximate to an intersection between the valve shaft and an upper surface of a top end of the valve body; and securing a top cap of the valve to the top end of the valve body such that a lower surface of the top cap directly contacts the seal, the top cap comprising a cap shoulder defining a cap shoulder surface facing downward, the cap shoulder surface facing the shaft shoulder surface.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

Figure 1:
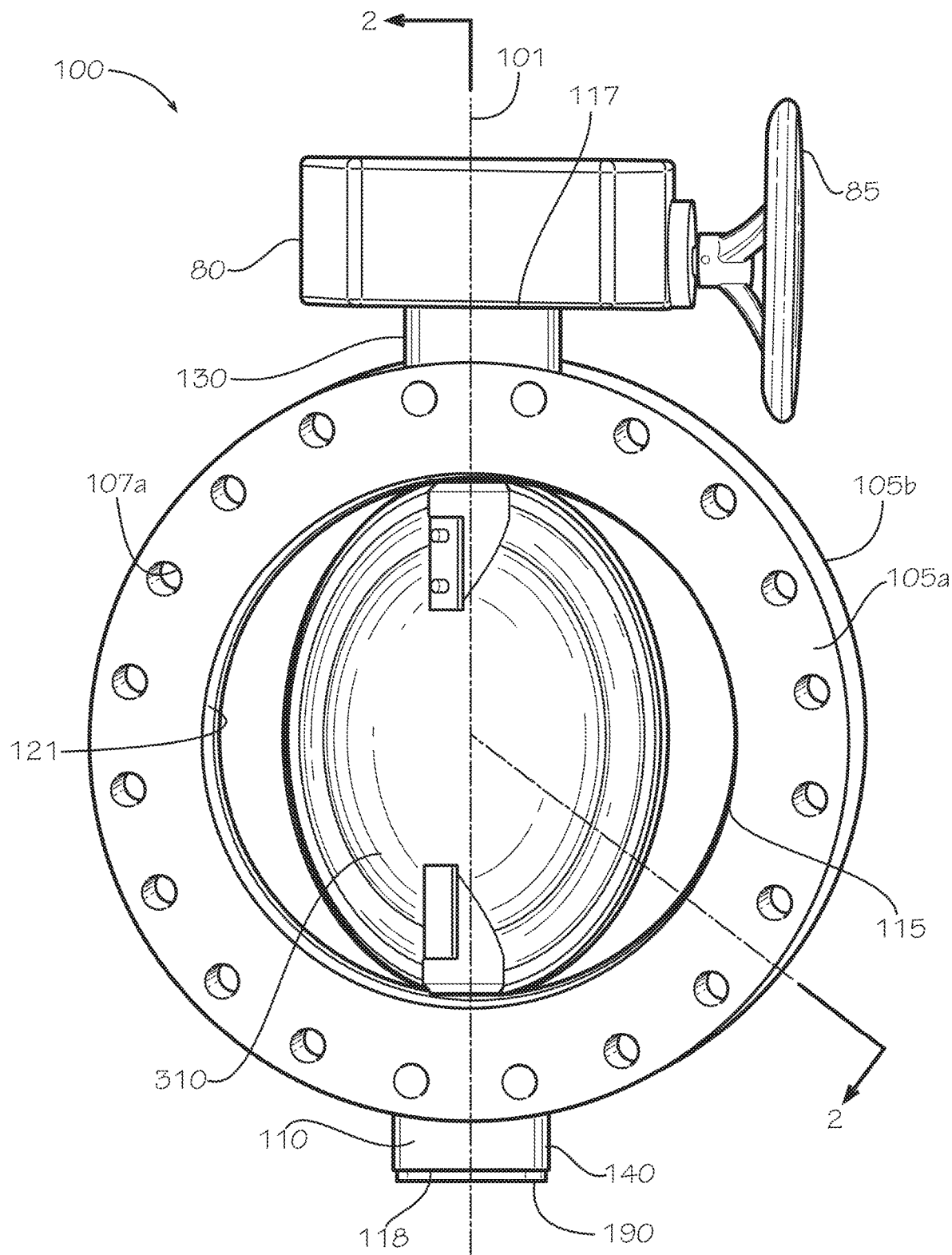
FIG. 1 is a side view of a valve in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

To simplify the description of various elements of the valve disclosed herein, the conventions of "top," "bottom," "inner," "outer," "inside," or "outside," may be referenced. Unless stated otherwise here or in the figures, "top" describes that side or end of the valve that is facing upward as shown in the figures and "bottom" is that side or end of the valve that is opposite or distal the top of the valve and is facing downward as shown in the figures. Likewise, "outer" describes that side of the valve that is facing outward and "inner" is that side of the valve that is facing inward.

In one aspect, a valve and associated methods, systems, devices, and various apparatuses are disclosed herein. In one aspect, the valve can comprise a top cap configured to retain a V-packing of the valve or a shaft of the valve or both the V-packing and the shaft of the valve.

FIG. 1 discloses a valve 100. In some aspects, the valve 100 can be a butterfly valve. In other aspects, the valve 100 can be one of various other types of valves including, but not limited to, a ball valve, a plug valve, or a cone valve, which can be configured to seal against an internal fluid pressure of as much as 200 psi, 250 psi, 300 psi, or higher. In some aspects, the valve 100 can be a butterfly valve having a single-shaft or through-shaft design. The fluid itself can be any one of a number of different fluid media including a gas such as air or a liquid such as water. The fluid can be flammable, non-flammable, explosive, or non-explosive.

Figure 2:
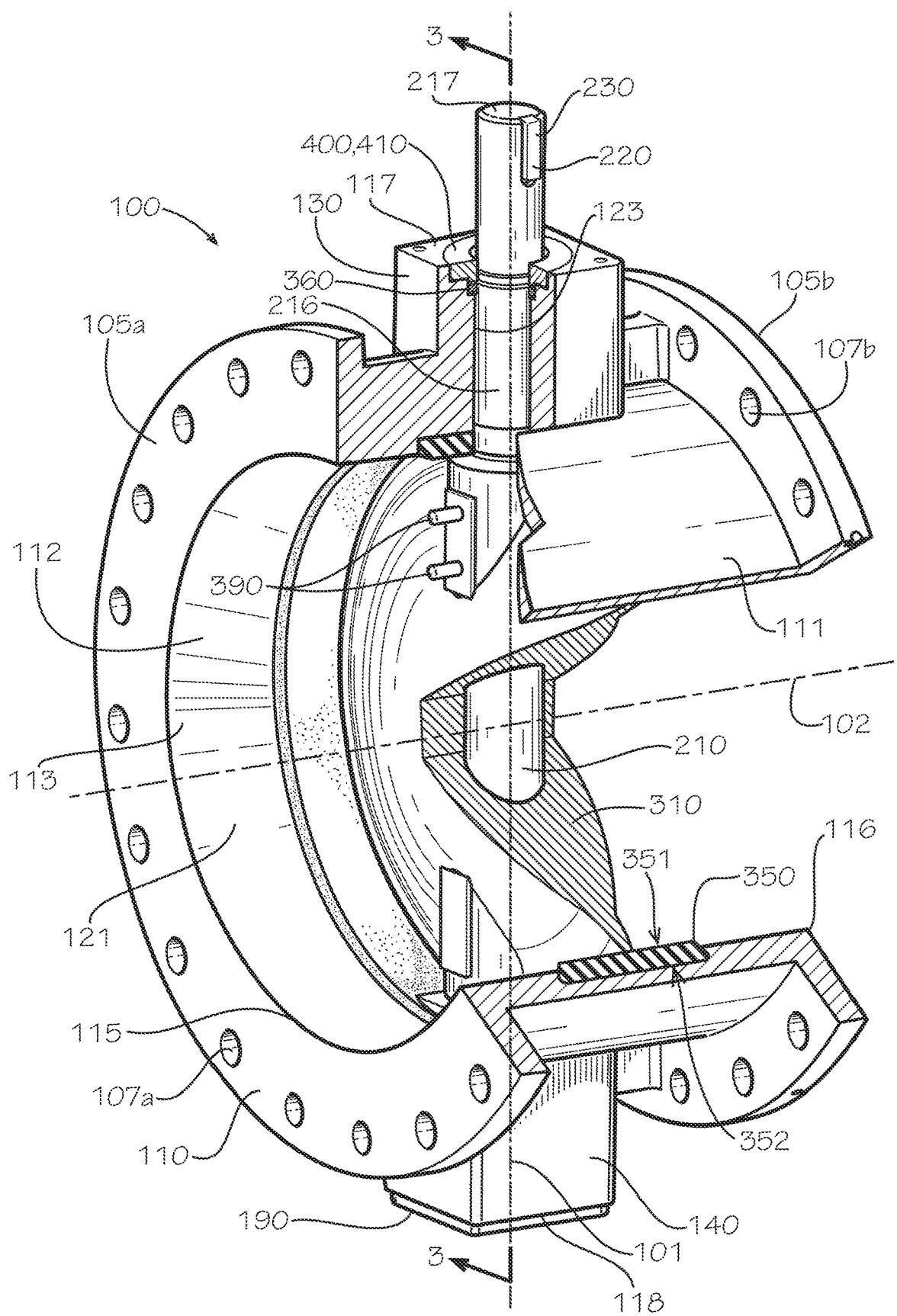
FIG. 2 is a perspective cutaway view of the valve of FIG. 1 taken along line 2-2 of FIG. 1.

The valve 100 can comprise a valve body 110 and a valve shaft 210 (shown in FIG. 2). The valve 100 can further comprise a valve disc 310 positioned within a fluid bore 121 of the valve body 110 through which fluid can pass. The valve 100 can further comprise an actuator 80 for rotating the valve shaft 210 within the valve body 110 to turn the valve disc 310 and thereby open the valve 100 to an open position or close the valve 100 to a closed position or to otherwise the adjust the flow of fluid through the valve 100. The valve body 110, the valve shaft 210, and the valve disc 310 can be aligned along a valve actuator axis 101 during assembly of the valve 100. In some aspects, the actuator 80 can comprise a handwheel operator 85 as shown, a lever operator (not shown), or a gear operator (not shown). In other aspects, the valve 100 can be made to open or close by pneumatic or electrical power or any other suitable method. The valve 100 can further define a flow axis 102 (shown in FIG. 2) of the fluid bore 121.

In some aspects, as in a typical butterfly valve, the valve disc 310 of the valve 100 can be configured to rotate within the shaft bore 123 of the valve body 110. More specifically, the valve disc 310 can be configured to rotate a quarter of a turn between a fully open position and a fully closed position. In a typical butterfly valve, a radial cross-section of a valve disc such as the valve disc 310 can be configured to remain in the path of the fluid traveling through the valve 100 even when the valve 100 is open. In other aspects, the type of valve, the rotation angle or rotation angle range, or the particular valve configuration can differ from that shown.

The valve body 110 can define an inlet 115, an outlet 116 (shown in FIG. 2) distal from the inlet 115, a top end 117, a bottom end 118 distal from the top end 117, the fluid bore 121 defined between the inlet 115 and the outlet 116, and a shaft bore 123 (shown in FIG. 2) defined in the top end 117 and the bottom end 118. In some aspects, the shaft bore 123 can comprise a first portion 124 (shown in FIG. 3) defined in the top end 117 of the valve body 110 and a second portion 125 (shown in FIG. 3) defined in the bottom end 118 of the valve body 110. In some aspects, the fluid bore 121 and the shaft bore 123 can be cylindrical in shape.

In some aspects, as shown in FIGS. 1 and 2, the valve body 110 can be a "flanged" type valve body comprising an attachment flange 105a,b on each axial end of the valve 100—relative to the flow axis 102—for attaching the valve to a piping system. Each of the attachment flanges 105a,b can respectively define a plurality of attachment holes 107a,b (107b shown in FIG. 2) through which a plurality of fasteners, including but not limited to nuts and bolts, can secure the valve 100 to the piping system. The valve body 110 may also be constructed as, for example and without limitation, a "lugged" type, a "wafer" type, or a "butt-weld" type valve. A "lugged" type valve comprises multiple lugs through which a plurality of fasteners can secure the valve 100 to the piping system, and a "wafer" type valve comprises neither lugs nor attachment flanges but is sandwiched between opposing flanges on the adjacent piping components of the piping system in which it is installed. A "butt-weld" type valve does not require fasteners for assembly to the piping system but is instead welded in place.

Figure 3:
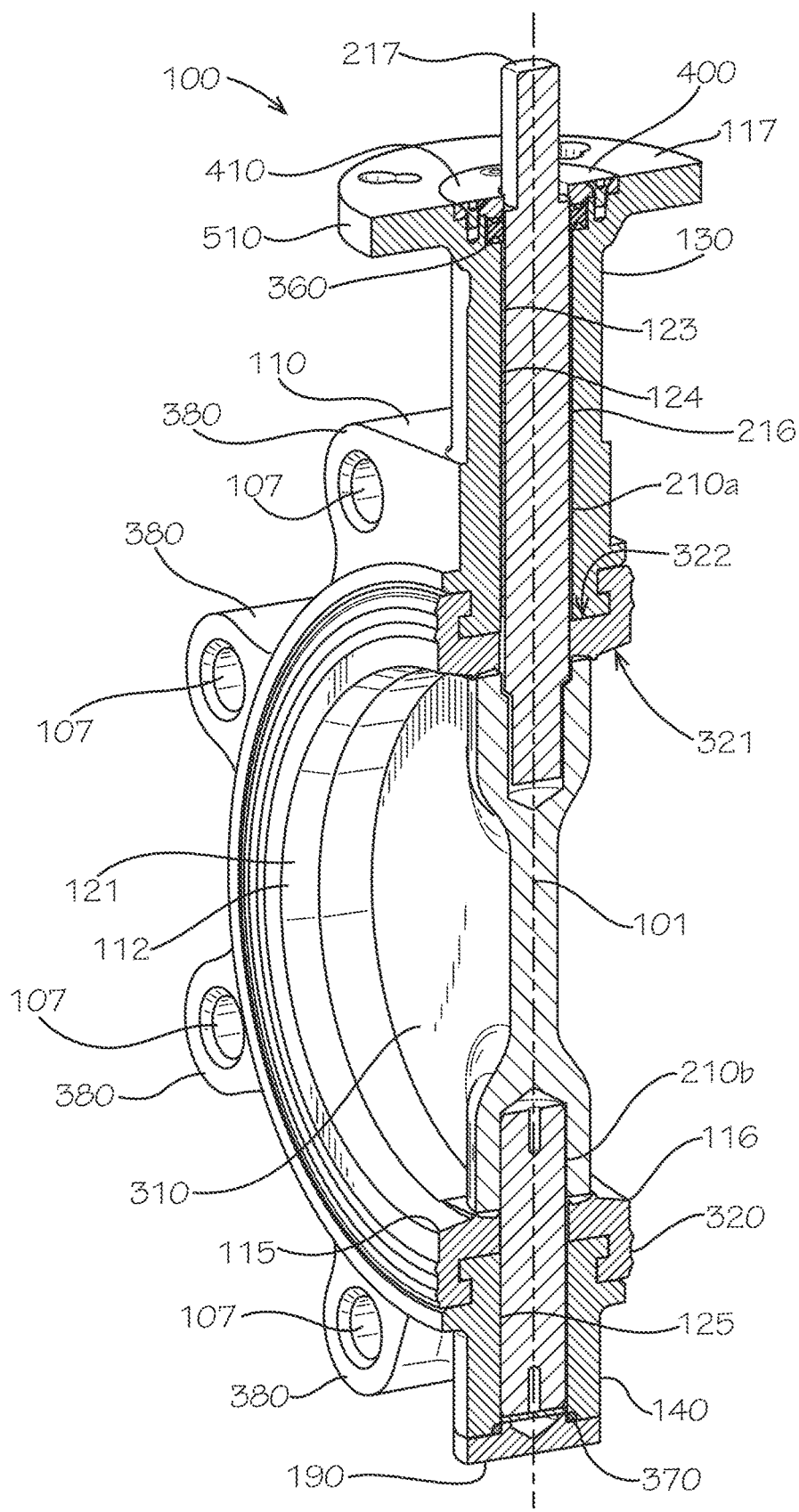
FIG. 3 is a sectional perspective view of the valve of FIG. 1 in accordance with another aspect of the current disclosure.

As shown in FIG. 2, the valve body 110 can further comprise an outer surface 111 and an inner surface 112, which can define an interior cavity 113. In some aspects, the valve 100 can comprise a liner 320 (shown in FIG. 3) defining the fluid bore 121 of the valve body 110 and extending from the inlet 115 to the outlet 116. In some aspects, as shown in FIG. 3, the valve disc 310 can seal against the liner 320 around a circumference of the valve disc 310. In other aspects, as shown in FIG. 2, the valve 100 can comprise a seat 350 against which the valve disc 310 can seal. In some aspects, the valve body 110 can further comprise a top trunnion 130 and a bottom trunnion 140. In some aspects, the actuator 80 can be secured to the top trunnion 130. In other aspects, a bottom cover 190 can be secured to the bottom trunnion 140 with a plurality of fasteners (not shown) extending through a plurality of attachment bores (not shown) defined in the bottom trunnion 140. In other aspects, the bottom cover 190 can be assembled to the bottom trunnion 140 by other methods, such as by a single fastener (not shown) or by welding.

The valve body 110 can be cast from any one or more of a number of different metals or metal alloys including, for example and without limitation, stainless steel, carbon steel, ductile iron, and various steel and non-steel alloys including INCOLLOY alloys, MONEL alloys, HASTELLOY alloys, INCONEL alloys, and chrome moly alloys. The valve body 110 can also be machined.

In some aspects, as shown in FIG. 2, the valve shaft 210 can be positioned at least partially within the shaft bore 123 of the valve body 110. For example and without limitation, the valve shaft 210 can comprise a single shaft such that a portion of the valve shaft 210 proximate to a top end 217 of the valve shaft 210 can be positioned within the first portion 124 of the shaft bore 123, and a portion of the valve shaft 210 proximate to a bottom end (not shown) of the valve shaft 210 can be positioned within the second portion 125 of the shaft bore 123. In some aspects, a bushing 216 can be positioned in the shaft bore 123 between the valve shaft 210 and the shaft bore 123.

In other aspects, as shown in FIG. 3, the valve 100 can comprise an upper valve shaft 210a positioned at least partially within the first portion 124 of the shaft bore 123 of the valve body 110 and secured to a top of the valve disc 310. Likewise, a lower valve shaft 210b can be positioned within the second portion 125 of the shaft bore 123 and secured to the bottom of the valve disc 310.

In some aspects, as shown in FIG. 2, the valve shaft 210 can be coupled to the valve disc 310 with a fastener 390 such as, for example and without limitation, a press-fit shaft pin. In some aspects, the fastener 390 can be solid in cross section. In other aspects, the fastener 390 can be hollow. In other aspects, the valve shaft 210 can be coupled to the valve disc 310 with more than one fastener 390. The valve shaft 210 can define a pin bore (not shown) or multiple pin bores, which can each be sized to receive one of the fasteners 390. Likewise, the valve disc 310 can define a pin bore (not shown) or multiple pin bores, which can each be sized to receive a one of the fasteners 390. The valve shaft 210 can further define a keyway 220 that can be sized to receive a key 230 for engagement with the actuator 80.

In other aspects, as shown in FIG. 2, the valve 100 can further comprise the seat 350 against which the valve disc 310 can seal when the valve 100 is in a fully closed position. The seat 350 can have an annular shape that extends circumferentially around the fluid bore 121, in contact with the inner surface 112 and, at least when the valve 100 is in the fully closed position, in contact with the valve disc 310. In other aspects, the seat 350 can be always in contact with the valve disc 310 at a top and at a bottom of the valve disc 310 proximate to the connection between the valve shaft 210 and the valve disc 310. The seat 350 can comprise an inner surface 351 in contact with the valve disc 310 and an outer surface 352 in contact with the valve body 110 and opposite from the inner surface 351. In some aspects, as shown, the seat 350 can be bonded to the valve body 110 using a process such as, for example and without limitation, a thermal bonding process. In other aspects, the seat 350 can be bonded to the valve body 110 using a fastener such as, for example and without limitation, an adhesive.

In other aspects, as shown in FIG. 3, the valve disc 310 of the valve 100 can seal against the liner 320 when the valve 100 is in a fully closed position. The liner 320 can have an annular shape that can extends circumferentially around the flow axis 102 and can define the fluid bore 121. The liner 320 can also define the inner surface 112 and, at least when the valve 100 is in the fully closed position, can contact the valve disc 310 around the perimeter of the valve disc 310. In some aspects, the liner 320 can be always in contact with the valve disc 310 at least at a top and at a bottom of the valve disc 310 proximate to where the valve shaft 210—or each of the valve shafts 210a,b—enters the valve disc 310. The liner 320 can comprise an inner surface 321 in contact with the valve disc 310 and an outer surface 322 in contact with the valve body 110 and opposite from the inner surface 321. In some aspects, as shown, the liner 320 can be bonded to the valve body 110 using a process such as, for example and without limitation, a thermal bonding process. In other aspects, the liner 320 can be bonded to the valve body 110 using a fastener such as, for example and without limitation, an adhesive.

In some aspects, as shown in FIG. 3, the valve 100 can be a lug-type valve comprising lugs 380 defining attachment holes 107. Whether or not the valve 100 is a lug-type valve, however, the valve 100 can further comprise an upper shaft seal 360 and a lower shaft seal 370 as shown. More specifically, the upper shaft seal 360 can seal a circumferential gap defined between the shaft bore 123 and the valve shaft 210a at the top end 117 of the valve 100 such that fluid from inside the fluid system cannot travel around the top end 217 of the valve shaft 210 or exit from the top end 117 of the valve 100. Similarly, the lower shaft seal 370 can seal a circumferential gap defined between the shaft bore 123 and the valve shaft 210a at the bottom end 118 of the valve 100 such that fluid from inside the fluid system cannot travel around the bottom end 218 of the valve shaft 210 or exit from the top end 117 or the bottom end 118 of the valve 100. Either or both of the upper shaft seal 360 and the lower shaft seal 370 can comprise a V-packing seal described in more detail below. The valve body 110 can also comprise a flange 510 defining the top end 117.

In a typical valve, the valve disc 310 can only rotate within the fluid bore 121 of the valve body 110 or, during service, can be removed through the fluid bore 121. In some aspects of a typical valve, the fasteners 390 can keep the valve shaft 210 or shafts 210a,210b inside the shaft bore 123. In other aspects, the bottom cover 190 and the force of gravity pulling the bottom end 218 of the valve shaft 210 against the bottom cover 190—in a valve 100 that is installed with the top end 117 above the bottom end 118—can keep the valve shaft 210 inside the shaft bore 123. In other aspects, the bottom cover 190 can function as a pressure boundary to keep the fluid from leaking out of the valve 100.

During use of the fluid system, fluid inside the fluid system and inside the valve 100 can leak into a space between the valve disc 310 and the seat 350 and subsequently into a space or gap defined between the shaft bore 123 and the valve shaft 210. As typically configured, the seat 350 provides only a passive seal that typically cannot prevent fluid into the space or gap between the shaft bore 123 and the valve shaft 210 and therefore at best can only reduce the amount of fluid that enters therein. This can be called a "wet seal" because fluid is allowed past the intersection of the valve disc 310 and the seat 350. In some aspects, including when high fluid pressures are experienced inside the valve 100, the seal provided by the upper shaft seal 360 can be not only beneficial, but also the last barrier or one of the last barriers against leakage.

Figure 4:
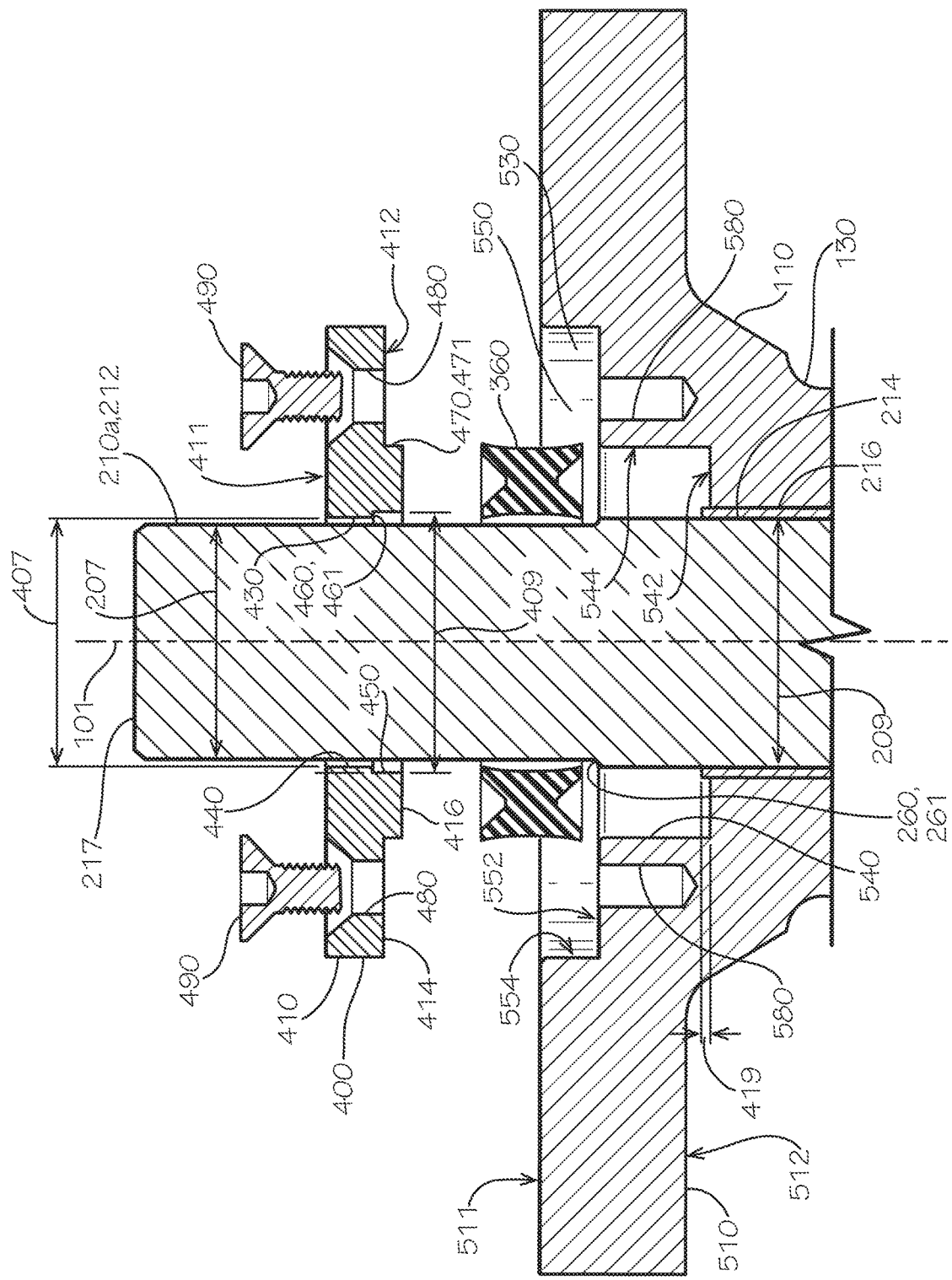
FIG. 4 is an exploded sectional detail view of an upper portion of the valve of FIG. 3.

As shown in FIGS. 2-4, the valve 100 can further comprise a top seal assembly 400 comprising a top cap 410 and the upper shaft seal 360. As shown in FIG. 4, the upper shaft seal 360, the top cap 410, the valve shaft 210a, and the valve body 110 can be aligned along the valve actuator axis 101 of the valve 100.

The top cap 410 can comprise an upper surface 411 and a lower surface 412 distal from the upper surface 411. The upper surface 411 and the lower surface 412 of the top cap 410 can define a bore 430 defining a bore axis 401 (shown in FIG. 6). The bore 430 can extend from the upper surface 411 to the lower surface 412. The top cap 410 can more specifically define a minor bore 440 and a major bore 450 of the bore 430. The minor bore 440 can intersect the upper surface 411 and define a minor bore diameter 407. The major bore 450 can intersect the lower surface 412 and define a major bore diameter 409. In some aspects, the major bore diameter 409 can be greater than the minor bore diameter 407. The top cap 410 can comprise a bore shoulder 460, which can define a bore shoulder surface 461 extending from the minor bore 440 to the major bore 450. In some aspects, as shown, the bore shoulder surface 461 can be angled 90 degrees with respect to the bore axis 401 of the top cap 410. In other aspects, the bore shoulder surface 461 can be angled at a different angle with respect to the bore axis 401. As shown, the bore shoulder 461 can face downward, i.e., towards the valve body 110.

The top cap 410 can comprise a seal shoulder 470 in the lower surface 412, which can define a first portion 414 and a second portion 416. The seal shoulder 470 can define a seal shoulder surface 471 extending from the first portion 414 of the lower surface 412 to the second portion 416 of the lower surface 412. In some aspects, the second portion 416 of the lower surface 412 can be offset along a direction of the bore axis 401 from the first portion 414 of the lower surface 412. In other aspects, the second portion 416 of the lower surface 412 can be flush or recessed with respect to the first portion 414. In other aspects, the second portion 416 can be offset from the first portion 414 by a greater amount than shown, i.e., the seal shoulder 470 can be taller than shown. In some aspects, the seal shoulder surface 471 can be substantially parallel to the bore axis 401. More specifically, the seal shoulder surface 471 can define a cylindrical surface that can be concentric about the bore axis 401. In other aspects, the seal shoulder surface 471 can be angled with respect to the bore axis 401. In some aspects, the first portion 414 of the lower surface 412 can be angled 90 degrees with respect to the bore axis 401. Likewise, the second portion 416 of the lower surface 412 can be angled 90 degrees with respect to the bore axis 401. In other aspects, the first portion 414 or the second portion 416 can be angled at a different angle with respect to the bore axis 401. The top cap 410 can further define a hole 480—or a plurality of holes 480—extending from the upper surface 411 to the lower surface 412. The hole 480—or each of the plurality of holes 480—can be sized to receive assembly fasteners 490, which can be countersunk in the top cap 410. Even with the assembly fasteners 490 installed in the holes 480 of the top cap, the upper surface 411 of the top cap 410 can thereby remain flat.

The valve shaft 210a—and, likewise, the one-piece valve shaft 210—can define a minor diameter 207 along a first section 212 of the valve shaft 210a proximate to the top end 217 and a major diameter 209 along a second section 214 of the valve shaft 210a distal from or at least offset from the top end 217. The valve shaft 210a can comprise a shaft shoulder 260 at an intersection between the first section 212 and the second section 214. The shaft shoulder 260 can define a shaft shoulder surface 261 extending from the first section 212 to the second section 214 and can face upward. In an assembled valve 100, and when the top cap 410 is aligned with and assembled to the valve shaft 210a, the shaft shoulder surface 261 can face the bore shoulder surface 461 of the top cap 410. As shown, the minor bore 407 of the top cap 410 can be less than the major diameter 209 of the valve shaft 210a. The bore shoulder surface 461 and the minor bore 407 of the top cap 410 can thereby prevent passage or discharge of the valve shaft 210a—including shaft blowout—through the top cap 410.

The upper shaft seal 360 can be an annular ring. In some aspects, the upper shaft seal 360 can comprise a V-type packing, which can be considered the aforementioned "V-packing" and can comprise flexible elements—flexible to the degree that the material forming the upper shaft seal 360 is itself deformable—having a "V" shape in cross-section. In some aspects, the upper shaft seal 360 can be an annular ring or can be circular. In other aspects, the upper shaft seal 360 can have a closed shape that is not necessarily circular. The upper shaft seal 360 can define approximately V-shaped grooves in top and bottom surfaces, i.e., axial end surfaces, of the upper shaft seal 360. In other aspects, the upper shaft seal 360 can define a different shape or can define elements having different shapes in cross-section. The upper shaft seal 360 can be positioned between the top cap 410 and the valve body 110. More specifically, the upper shaft seal 360 can be positioned above the bushing 216, i.e., between the bushing 216 and the top cap 410. By pressure resulting from contact between the top cap 410 and the upper shaft seal 360, the upper shaft seal 360 can maintain the position of the bushing 216 along the valve actuator axis 101. Furthermore, the top cap 410 can contact the upper shaft seal 360 without the use of washers or shims sized to approximately match an outer diameter of the upper shaft seal 360. The second portion 416 of the top cap 410 can be sized to contact and maintain pressure against the upper shaft seal 360, and it can be sized to approximately match the outer diameter of the upper shaft seal 360. The upper shaft seal 360 can be configured to seal against leakage from between the valve body 110 and the valve shaft 210*a*.

In some aspects, the lower surface 412 of the top cap 410 can directly contact the upper shaft seal 360. In other aspects, a washer, a shim, or another component of the valve 100 and more specifically the top seal assembly 400 can be positioned between the top cap 410 and the upper shaft seal 360.

A trunnion of the valve body 110 such as the top trunnion 130 can, in part or in whole, define the shaft bore 123. The valve body 110, and more specifically the top trunnion 130, can comprise a flange 510, which can define the top end 117 and an upper surface 511 of the valve body 110. The flange 510 can further define a lower surface 512. The valve body 110 can further define a chamber 530 in the top end 117, which can be sized to receive at least a portion of the top cap 410. The chamber 530 can define assembly bores 580, which can be sized to receive the assembly fasteners 490.

The valve body 110 can more specifically define a first or minor chamber 540 and a second or major chamber 550 of the chamber 530. The minor chamber 540 can define a minor chamber diameter 547 (shown in FIG. 5), and the major chamber 550 can define a major chamber diameter 557 (also shown in FIG. 5). The minor chamber 540 can more specifically define a floor surface 542 and a wall surface 544, which can be angled with respect to the floor surface 542. Likewise, the major chamber 550 can define a floor surface 552 and a wall surface 554, which can be angled with respect to the floor surface 552. The major chamber 550 of the chamber 530 of the valve body 110 can be sized and shaped to receive the first portion 414 of the top cap 410. Likewise, the minor chamber 540 of the chamber 530 of the valve body 110 can be sized and shaped to receive the second portion 416 and also the seal shoulder 470 of the top cap 410.

In some aspects of the valve 100 as assembled, the upper surface 411 of the top cap 410 can be substantially flush with the upper surface 511 of the valve body 110. The valve 100 can further comprise the bushing 216, which can be positioned about the valve shaft 210*a* in the shaft bore 123 between the valve shaft 210*a* and the shaft bore 123*a*. In some aspects, the bushing 216 can be a split bushing or can comprise a seam. In other aspects, the bushing 216 can be a continuous bushing with no split or seam. As shown, the upper shaft seal 360 can be positioned between the bushing 216 and the top cap 410. In some aspects, an upper edge of the bushing 216 can extend past the floor surface 542 of the minor chamber 540, which can be considered the floor surface of the chamber 530, by an extension distance 419. In other aspects, the upper edge of the bushing 216 can be recessed back from the floor surface 542 of the minor chamber 540.

Figure 5:
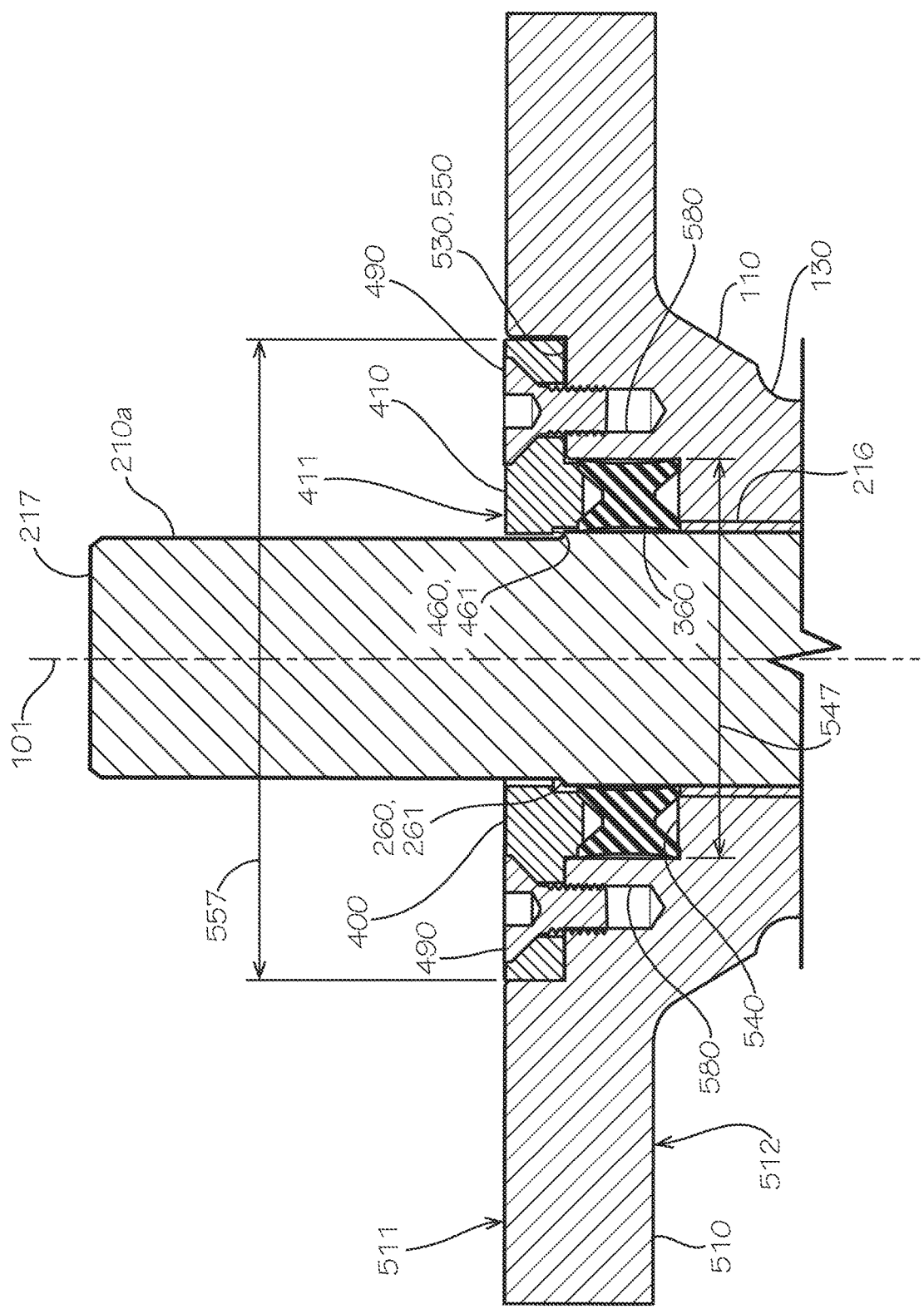
FIG. 5 is a sectional detail view of the upper portion of the valve of FIG. 3.

In some aspects, as shown in FIG. 5, the top cap 410 can be secured to the valve body 110. In some aspects, as shown, the top cap 410 can be received completely within the chamber 530 such that the top cap 410 is substantially flush with the upper surface 511 of the flange 510. In other aspects, the top cap 410 can be perfectly flush with or even recessed from the upper surface 511 of the flange 510. In other aspects, the top cap 410 can protrude from the upper surface 511 of the flange 510. The assembly bores 580 can be threaded to receive and engage the assembly fasteners 490.

Figure 6:
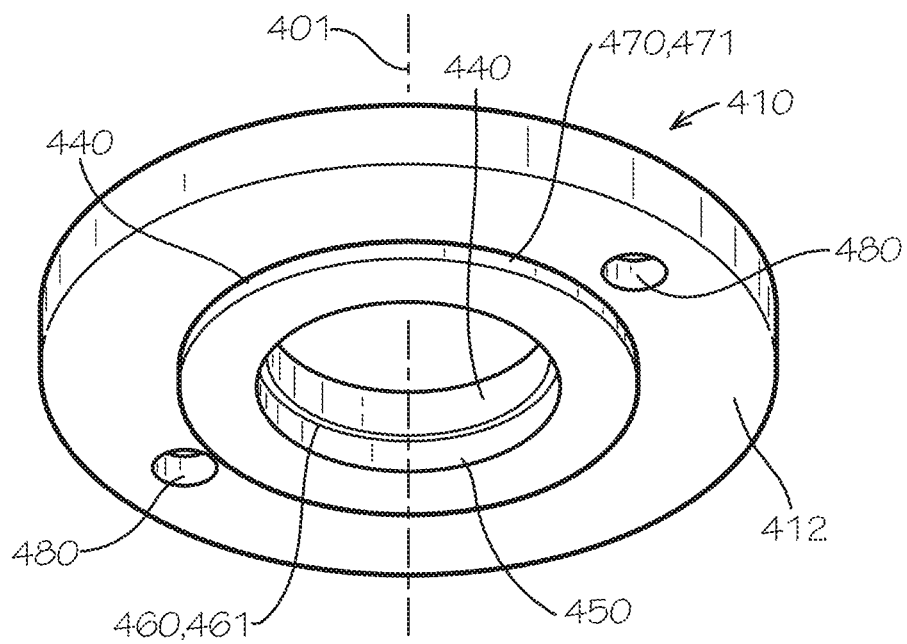
FIG. 6 is a top cap of the valve of FIG. 3.
Figure 7:
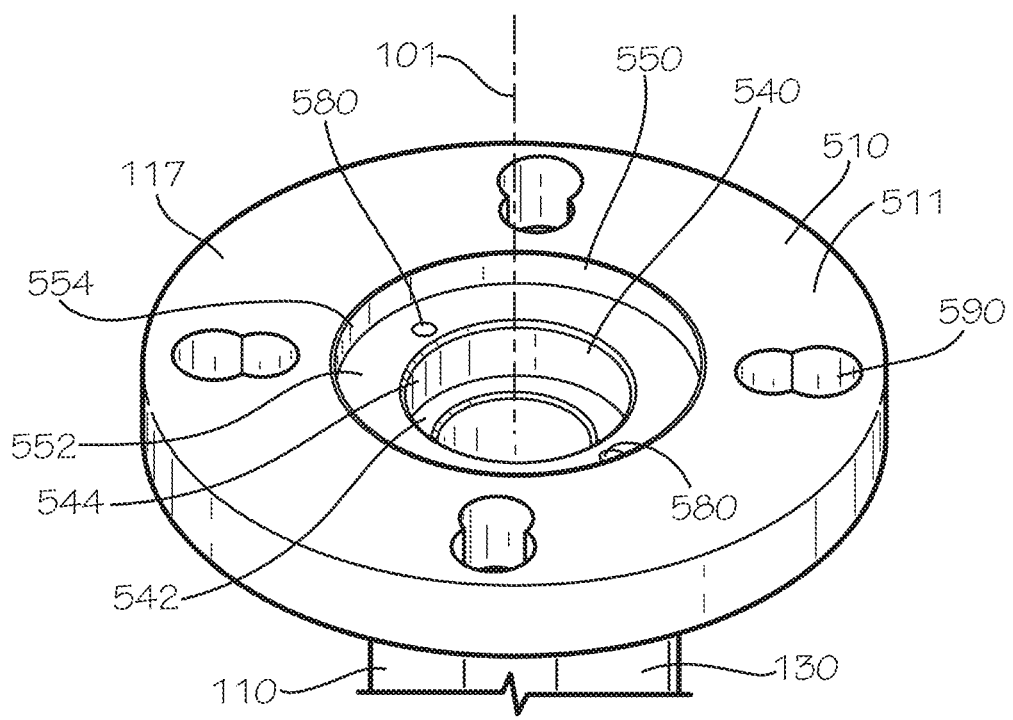
FIG. 7 is a top trunnion of the valve of FIG. 3.

FIGS. 6 and 7 show in perspective view various elements of the top cap 410 and the flange 510, respectively, of the valve 100. In some aspects, as shown, each of the top cap 410 and the flange 510 can have a circular or annular shape. In some aspects, as shown, the top cap can define a pair of the holes 480, which can be defined in the top cap 410 at positions opposite each other with respect to the bore axis 401. In other aspects, any quantity, pattern, shape, and orientation of the holes 480 can be used. In other aspects, the holes 480 and the fasteners 490 need not be used, in which case another fastening method can be used to secure the top cap 410.

As shown in FIG. 7, the flange 510 can define flange bores 590, which can be used to secure a mating component of the valve 100 such as, for example and without limitation, the actuator 80. In some aspects, as shown, the flange bores 590 can define a figure-8 shape to accommodate two different mounting bolt patterns. In other aspects, the flange bores 590 can define a simple circular shape or any other desired shape. Edges defined by an intersection between the minor chamber 540 and the shaft bore 123 and by an intersection between the minor chamber 540 and the major chamber 550 can be chamfered as shown to ease assembly.

A method of assembling the valve 100 can comprise inserting the valve shaft 210 into the shaft bore 123 defined in the valve body 110 of the valve 100. The method can further comprise inserting the upper shaft seal 360 into the chamber 530 defined in the upper surface 511 of the top end 117 of the valve body 110, which can be defined in the flange 510 of the valve body 110. The method can comprise positioning the upper shaft seal 360 about the valve shaft 210,210*a* proximate to an intersection between the valve shaft 210,210*a* and the upper surface 511 of the top end 117 of the valve body 110. The method can further comprise securing a top cap 410 of the valve 100 to the top end 117 of the valve body 110 such that the lower surface 412 of the top cap 410 directly contacts the upper shaft seal 360.

The method can further comprise blocking movement of the shaft shoulder surface 261 of the shaft shoulder 260 of the valve shaft 210,210*a* past the bore shoulder surface 461 of the top cap 410. The method can further comprise inserting the top cap 410 at least partly into the chamber 530 of the valve body 110. The method of inserting the top cap 410 can comprise inserting the top cap 410 into the major chamber 550. The method can further comprise inserting the top cap 410 into the minor chamber 540 of the chamber 530. In some aspects, the method can further comprise contacting the bushing 216 with the upper shaft seal 360. In other aspects, the method can further comprise contacting the bushing 216 with the top cap 410. In other aspects, the method can further comprise pushing the bushing 216 with the upper shaft seal 360 or the top cap 410 into the shaft bore 123 to maintain the position of the bushing 216. The method can further comprise aligning the valve shaft 210,210*a*, the upper shaft seal 360, and the top cap 410 along the valve actuator axis 101 of the valve body 110.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A valve comprising:
a valve body defining a shaft bore therethrough, the shaft bore defining an axis extending through the valve body;
a valve shaft positioned within and configured to rotate within the shaft bore of the valve body, the valve shaft comprising a first section and a second section, the first section proximate to a top end of the valve shaft and defining a minor shaft diameter and the second section distal from the top end of the valve shaft and defining a major shaft diameter, the major shaft diameter of the valve shaft being greater than the minor shaft diameter of the valve shaft, the valve shaft comprising a shaft shoulder defining a shaft shoulder surface facing upward, the shaft shoulder positioned at an intersection between the first section and the second section of the valve shaft, the shaft shoulder surface extending from the first section to the second section;
a top cap secured to the valve body, the top cap comprising:
an upper surface; and
a lower surface distal from the upper surface;
wherein the upper surface and the lower surface of the top cap defines a bore and the bore defines a bore axis, the bore extending from the upper surface to the lower surface, the top cap defining:
a cylindrical minor bore of the bore, the minor bore intersecting the upper surface and defining a minor bore diameter; and
a cylindrical major bore of the bore, the major bore intersecting the lower surface and defining a major bore diameter, the major bore diameter being greater than the minor bore diameter, the top cap comprising a bore shoulder extending from the minor bore to the major bore and defining a bore shoulder surface extending from the minor bore to the major bore and facing the shaft shoulder surface of the valve shaft, the major shaft diameter of the valve shaft greater than the minor bore diameter of the minor bore of the top cap but less than the major bore diameter of the major bore of the top cap, movement of the second section of the valve shaft through the minor bore of the top cap stopped by the shaft shoulder surface; and
a seal positioned between the top cap and the valve body, the seal configured to seal against leakage from between the valve body and the valve shaft, wherein a portion of the second section of the valve shaft is received within the major bore of the top cap.

2. The valve of claim 1, wherein the top cap comprises a seal shoulder in the lower surface of the top cap, the seal shoulder defining a seal shoulder surface extending from a first portion of the lower surface to a second portion of the lower surface, the second portion of the lower surface offset along a direction of the bore axis from the first portion of the lower surface.

3. The valve of claim 2, wherein the seal shoulder surface is substantially parallel to the bore axis, the seal shoulder surface defining a cylindrical surface.

4. The valve of claim 1, wherein the first portion of the lower surface is angled 90 degrees with respect to the bore axis.

5. The valve of claim 1, wherein the second portion of the lower surface is angled 90 degrees with respect to the bore axis.

6. The valve of claim 1, wherein the seal is an annular ring comprising a V-type packing defining a V-shaped groove in an axial end surface of the packing.

7. The valve of claim 1, wherein the lower surface of the top cap directly contacts the seal.

8. The valve of claim 1, further comprising a bushing positioned about the valve shaft in the shaft bore between the valve shaft and the shaft bore, wherein the seal is positioned between the bushing and the top cap.

9. A method of assembling the valve of claim 1, the method comprising:
inserting the valve shaft into the shaft bore defined in the valve body of the valve;
inserting the seal into a chamber defined in the upper surface of a top end of the valve body, the seal positioned about the valve shaft proximate to an intersection between the valve shaft and an upper surface of a top end of the valve body; and
securing the top cap of the valve to the top end of the valve body.

10. The method of claim 9, wherein securing the top cap of the valve to the top end of the valve body comprises securing the top cap of the valve to the top end of the valve body such that a lower surface of the top cap directly contacts the seal.

11. A valve comprising:
a valve body defining a shaft bore therethrough, the shaft bore defining an axis extending through the valve body;
a valve shaft positioned within and configured to rotate within the shaft bore of the valve body, the valve shaft comprising a first section and a second section, the first section proximate to a top end of the valve shaft and defining a minor shaft diameter and the second section distal from the top end of the valve shaft and defining a major shaft diameter, the major shaft diameter of the valve shaft being greater than the minor shaft diameter of the valve shaft, the valve shaft comprising a shaft shoulder defining a shaft shoulder surface facing upward, the shaft shoulder positioned at an intersection between the first section and the second section of the valve shaft, the shaft shoulder surface extending from the first section to the second section;

a top cap secured to the valve body, the top cap comprising:

an upper surface; and a lower surface distal from the upper surface;

wherein the upper surface and the lower surface of the top cap defines a bore and the bore defines a bore axis, the bore extending from the upper surface to the lower surface, the top cap defining:

a cylindrical minor bore of the bore, the minor bore intersecting the upper surface and defining a minor bore diameter; and a cylindrical major bore of the bore, the major bore intersecting the lower surface and defining a major bore diameter, the major bore diameter being greater than the minor bore diameter, the top cap comprising a bore shoulder extending from the minor bore to the major bore and defining a bore shoulder surface extending from the minor bore to the major bore and facing the shaft shoulder surface of the valve shaft, the major shaft diameter of the valve shaft greater than the minor bore diameter of the minor bore of the top cap but less than the major bore diameter of the major bore of the top cap, movement of the second section of the valve shaft through the minor bore of the top cap stopped by the shaft shoulder surface; and a seal positioned between the top cap and the valve body, the seal configured to seal against leakage from between the valve body and the valve shaft, the lower surface of the top cap directly contacting the seal.

12. The valve of claim 11, further comprising a bushing positioned about the valve shaft in the shaft bore between the valve shaft and the shaft bore, wherein the seal is positioned between the bushing and the top cap.

13. A valve comprising:

a valve body defining a shaft bore therethrough, the shaft bore defining an axis extending through the valve body;

a valve shaft positioned within and configured to rotate within the shaft bore of the valve body, the valve shaft comprising a first section and a second section, the first section proximate to a top end of the valve shaft and defining a minor shaft diameter and the second section distal from the top end of the valve shaft and defining a major shaft diameter, the major shaft diameter of the valve shaft being greater than the minor shaft diameter of the valve shaft, the valve shaft comprising a shaft shoulder defining a shaft shoulder surface facing upward, the shaft shoulder positioned at an intersection between the first section and the second section of the valve shaft, the shaft shoulder surface extending from the first section to the second section;

a top cap secured to the valve body, the top cap comprising:

an upper surface; and a lower surface distal from the upper surface;

wherein the upper surface and the lower surface of the top cap defines a bore and the bore defines a bore axis, the bore extending from the upper surface to the lower surface, the top cap defining:

a cylindrical minor bore of the bore, the minor bore intersecting the upper surface and defining a minor bore diameter; and a cylindrical major bore of the bore, the major bore intersecting the lower surface and defining a major bore diameter, the major bore diameter being greater than the minor bore diameter, the top cap comprising a bore shoulder extending from the minor bore to the major bore and defining a bore shoulder surface extending from the minor bore to the major bore and facing the shaft shoulder surface of the valve shaft, the major shaft diameter of the valve shaft greater than the minor bore diameter of the minor bore of the top cap but less than the major bore diameter of the major bore of the top cap, movement of the second section of the valve shaft through the minor bore of the top cap stopped by the shaft shoulder surface;

a bushing positioned about the valve shaft in the shaft bore between the valve shaft and the shaft bore; and a seal positioned between the bushing and the top cap, the seal configured to seal against leakage from between the valve body and the valve shaft.

14. The valve of claim 13, wherein the top cap comprises a seal shoulder in the lower surface of the top cap, the seal shoulder defining a seal shoulder surface extending from a first portion of the lower surface to a second portion of the lower surface, the second portion of the lower surface offset along a direction of the bore axis from the first portion of the lower surface.

15. The valve of claim 14, wherein the seal shoulder surface is substantially parallel to the bore axis, the seal shoulder surface defining a cylindrical surface.

16. The valve of claim 13, wherein the first portion of the lower surface is angled 90 degrees with respect to the bore axis.

17. The valve of claim 13, wherein the second portion of the lower surface is angled 90 degrees with respect to the bore axis.

18. The valve of claim 13, wherein the seal is an annular ring comprising a V-type packing defining a V-shaped groove in an axial end surface of the packing.

19. The valve of claim 13, wherein the seal is configured to maintain a position of the bushing in an axial direction of the bushing.

20. A method of assembling the valve of claim 13, further comprising maintaining a position of the bushing in an axial direction by pressure resulting from contact between the top cap and the seal.

* * * * *